(12) United States Patent
Yoshikawa

(10) Patent No.: US 8,386,989 B2
(45) Date of Patent: Feb. 26, 2013

(54) SEMICONDUCTOR CIRCUIT DESIGN SUPPORT TECHNIQUE

(75) Inventor: Takahide Yoshikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 264 days.

(21) Appl. No.: 12/358,888

(22) Filed: Jan. 23, 2009

(65) Prior Publication Data
US 2009/0293025 A1    Nov. 26, 2009

(30) Foreign Application Priority Data

May 23, 2008    (JP) .................. 2008-135003

(51) Int. Cl.
*G06F 11/22* (2006.01)
*G06F 17/50* (2006.01)

(52) U.S. Cl. .............. 716/136; 716/106; 716/111

(58) Field of Classification Search .............. 716/136
See application file for complete search history.

(56) References Cited

U.S. PATENT DOCUMENTS

| | | | | |
|---|---|---|---|---|
| 4,907,180 | A * | 3/1990 | Smith .............. | 703/14 |
| 6,286,114 | B1 | 9/2001 | Veenstra et al. | |
| 2008/0059923 | A1 | 3/2008 | Sasaki et al. | |
| 2008/0077380 | A1 | 3/2008 | Tamaki et al. | |
| 2008/0133180 | A1* | 6/2008 | Floyd et al. .............. | 702/186 |

FOREIGN PATENT DOCUMENTS

| | | |
|---|---|---|
| JP | 04-195593 | 7/1992 |
| JP | 11-296403 | 10/1999 |
| JP | 2003-283311 | 10/2003 |
| JP | 2004-280426 | 10/2004 |
| JP | 2008-065382 | 3/2008 |
| JP | 2008-065496 | 3/2008 |

OTHER PUBLICATIONS

Notification of Reasons for Refusal transmitted Mar. 27, 2012 (copy and English translation) from corresponding Japanese Patent Application No. 2008-135003.

* cited by examiner

*Primary Examiner* — Paul Dinh
*Assistant Examiner* — Bryce Aisaka
(74) *Attorney, Agent, or Firm* — Greer, Burns & Crain, Ltd.

(57) ABSTRACT

Designation of observation points in an observation target circuit for which operations are observed in simulation is accepted, and circuit data of an observation circuit is attached to circuit data of the observation target circuit so that the observation circuit is connected to the observation target circuit according to designation data of the observation points. At this time, a double-buffer configuration is adopted for the observation circuit, and the number of occurrence times of a specific state at a specific observation point during a first period and the number of occurrence times of the specific state at the specific observation point during a second period are alternately outputted and stored into RAM.

5 Claims, 15 Drawing Sheets

|  | CKIH | CE | WE |
|---|---|---|---|
| STOP | 1 | x | x |
| WAIT | 0 | 0 | x |
| READ | 0 | 1 | 0 |
| WRITE | 0 | 1 | 1 |

|  | CKIH | ModIH |
|---|---|---|
| STOP | 1 | x |
| WAIT | 0 | 1 |
| OPERATE | 0 | 0 |

|  |  | MODULE A | | |
|---|---|---|---|---|
|  |  | STOP | WAIT | OPERATE |
| MODULE B | STOP | 1 | 2 | 3 |
|  | WAIT | 4 | 5 | 6 |
|  | OPERATE | 7 | 8 | 9 |

832, 1216, 1353, 1268, 1506, 608, 384, 2608, 1360, 734, 1858,
800, 1984, 672, 576, 416, 3136, 960, 698, 1892, 1952, 864,
672, 352, 1552, 2095, 896, 1696, 864, 1920, 960, 544, 384,
2182, 1658, 672, 2048, 2080, 963, 573, 448, 321, 2974, 1024,
1760, 1154, 1886, 768, 704, 352, 1300, 2245, 870, 2016, 2048,
897, 702, 416, 384, 1923, 1774, 1487, 1418, 2229, 881, 463,
416, 256, 3089, 879, 2048, 2240, 1024···..

| SIGNAL NAME | NO. OF SIGNAL CHANGE TIMES | OPERATIONAL RATIO |
|---|---|---|
| a | 1661 | 0.027683 |
| b | 20787 | 0.346450 |
| c | 7145 | 0.119083 |
| ⋮ | ⋮ | ⋮ |

FIG.15

| LOGIC MODULE | INPUT WIRING | OUTPUT WIRING |
|---|---|---|
| A | a, b | f |
| B | c, d | e |
| C | g, p | q |
| ⋮ | ⋮ | ⋮ |

FIG.17

| WIRING | COORDINATES |
|---|---|
| a | a1 |
| b | b1 |
| c | c1 |
| ⋮ | ⋮ |

FIG.18

| LOGIC MODULE | COORDINATES |
|---|---|
| A | A1 |
| B | B1 |
| C | C1 |
| ⋮ | ⋮ |

FIG.19

SEMICONDUCTOR CIRCUIT DESIGN SUPPORT TECHNIQUE

CROSS-REFERENCE TO RELATED APPLICATIONS

This application is based upon and claims the benefit of priority of the prior Japanese Patent Application No. 2008-135003, filed on May 23, 2008, the entire contents of which are incorporated herein by reference.

FIELD

The embodiments discussed herein relate to a design support technique of a semiconductor circuit.

BACKGROUND

Recently, for example, in the processor or the like, the increase of the heat generation and/or the power consumption become a large problem. Along with this problem, a lot of tools to detect the behavior of the average heat generation and/or average power consumption and carry out the visualization or automatic modification are proposed. However, as for the heat generation and/or power consumption, not only the average behavior but also the temporal and/or spatial maldistribution may be a large problem. For example, the momentary change of the power consumption causes a malfunction due to the noise and/or the voltage drop. In addition, the local heat generation may cause the thermal runaway and/or destruction because the cooling is not in time locally. Then, it is desired that the several benchmark tests are carried out at the chip design stage to identify when and where the large load occurs and the design and/or implementation are optimized so that the load is not maldistributed in terms of time and space.

On the other hand, because huge costs and very long time are required for the design change of the processor or the like, the investigation (e.g. the logical verification and analysis of the power consumption and heat generation) of the behavior in the processor or the like is carried out before actually making the chip. However, when the inside of the recent processor or the like including more than one billion transistors is investigated by the software simulation, the operation speed in the simulation does not reach several Hz although it is actually several GHz. Then, the tools to carry out hardware acceleration of the simulation are provided from a lot of vendors.

When such an accelerator is used, the signal waves in the chip are obtained as a simulation result at the speed as fast as about 10 thousand times of the software simulator. As schematically depicted in FIG. 28, when Wire A and Wire B are defined as input wirings of a logic circuit of an AND circuit and Wire C is defined as an output wiring of the AND circuit, a predetermined input pattern is inputted to such logic circuits in the accelerator and the signal waves of the Wire A, Wire B and Wire C are obtained as an observation result as depicted in the right of FIG. 28.

Here, the consumed power can be calculated by using the observed waves in the wirings (=the number of change times of signals), wiring capacities and capacitances of logic cells (e.g. AND and OR) connected to the wirings, according to the relation "power consumption is proportional to (wiring capacities+cell capacitances)*the number of change times of signals". However, even if all of the operations of more than billion logic cells are presented to a designer as wave signals and/or consumed power values of the individual cells, it is impossible for the designer to review all data.

On the other hand, in order to optimize the power consumption of the chip, following things must be considered: (1) the reduction of the total power consumption and/or total heat generation (specifically, the optimization of the logic and/or the optimization of the implementation in order to decrease the average power consumption and/or the average heat generation of the entire chip (i.e. cell downsizing, factoring, pin swapping or the like)); and (2) the reduction of the maldistribution of the power consumption and heat generation (specifically, when a lot of cells, which have possibility that they simultaneously operate, and/or a lot of cells, which have high operational ratio, are disposed too closely, the maldistribution of the power consumption is caused. This causes the local voltage fluctuation and heat generation, and further becomes a cause of the malfunction. The optimization of the logic and/or implementation may be carried out in order to smooth this maldistribution. Namely, re-disposition of the cells, the change of the logic and the like are carried out.)

A lot of methods for reducing the total power consumption and total heat generation have been proposed. As tools to automatically optimize the power consumption, some products have been sold. In addition, some tools to present the designer with the behavior of the power consumption and/or heat generation and narrow points necessary for the design improvement have been proposed.

Moreover, some documents disclose, for example, a processing including (1) defining observation targets (extracting characteristic signals such as a clock gating signal, a chip enable signal and the like); (2) attaching observation circuits (attaching counter circuits and registers storing the counting result to wirings of the respective signals to be observed); (3) observing the counters (operating the logic with the counter circuits on the simulator); (4) detecting peaks (identifying characteristic points at which the large change in the operation is found from the counting results); (5) measuring operational ratio (gathering detailed signal waves at the detected points); and (6) displaying the results (calculating the consumed power values from the signal waves and implementation information (capacitances of the cells and/or wirings), and presenting the designer with the numeral results).

However, the aforementioned conventional arts can obtain information necessary to reduce the average operational power consumption. However, they cannot obtain information necessary to smooth the maldistribution. This is because (1) the data amount to be processed is too large to gather all data and (2) even if a large amount of data can be gathered, it cannot be presented for the designer in an appropriate mode.

A specific example of (1) is described. Here, it is assumed that data concerning how often modules A and B operate is independently gathered, for example. The result is depicted in FIG. 29. Namely, both of the modules A and B operate once until time 1. The modules A and B also operate once from the time 1 to time 2. Then, the average consumed power from time 0 to the time 1 is the same as the average consumed power from the time 1 to the time 2. However, when considering the local power consumption and heat generation, it is said that the load from the time 0 to the time 1 during which the modules A and B simultaneously operate is larger than the load from the time 1 to the time 2 during which the modules A and B separately operate. Namely, in order to smooth the maldistribution of the power consumption, it is required to identify when and how the plural modules (e.g. neighboring modules) simultaneously operate. However, because a lot of modules are incorporated into the chip, it is impractical to select all combinations of them.

This is because only the counters (including registers that holds the counted value as depicted in FIG. 31) that count the number of pluses are simply attached to the characteristic signal wirings such as the gating clock signal as depicted in FIG. 30. Specifically, it takes one to two seconds per one time and one register as overheads to read out the counted value from the 32-bit register, which is disposed on the accelerator and holds the counted value. Then, it takes 56 hours=0.2 million*1 second to read out the counted value once from 0.2 million registers distributedly disposed on the accelerator as depicted in FIG. 30. Thus, it is difficult for the conventional arts to gather the large amount of data.

In addition, when specifically describing about (2), even if all of the operational ratios for several hundred thousand or several million module combinations are gathered and they are presented by the simple enumeration of the numerical values or consumed power graph for each module, it is difficult for the designer to grasp all of them. Namely, the designer analyzes only several hundred modules at the most.

Therefore, in the conventional arts, there is no semiconductor circuit design support technique enabling to gather the observation data for a lot of observation points in the observation target circuit from the simulation accelerator within the practical time.

In addition, in the conventional arts, there is no semiconductor circuit design support technique enabling to present with a large amount of data gathered from the observation points in the observation target circuit in such a mode that the designer easily grasp them.

SUMMARY

According to one aspect of embodiments, a semiconductor circuit design support method includes: accepting designation of observation points in an observation target circuit in which operational observation is carried out in simulation, and storing data relating to the designation of the observation points into a storage device; and attaching circuit data of an observation circuit to circuit data of the observation target circuit, which is stored in an observation target circuit data storage device, so that the observation circuit is connected to the observation target circuit according to the data relating to the designation of the observation points, which is stored in the storage device, and storing the circuit data of the observation target circuit, which includes the circuit data of the observation circuit, into a simulation data storage device.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 15 is a diagram depicting an example of data stored in an operational ratio storage;

FIG. 17 is a diagram depicting an example of data stored in an observation target circuit data storage;

FIG. 18 is a diagram depicting an example of data stored in the observation target circuit data storage;

FIG. 19 is a diagram depicting an example of data stored in the observation target circuit data storage;

DESCRIPTION OF EMBODIMENTS

Figure 1:
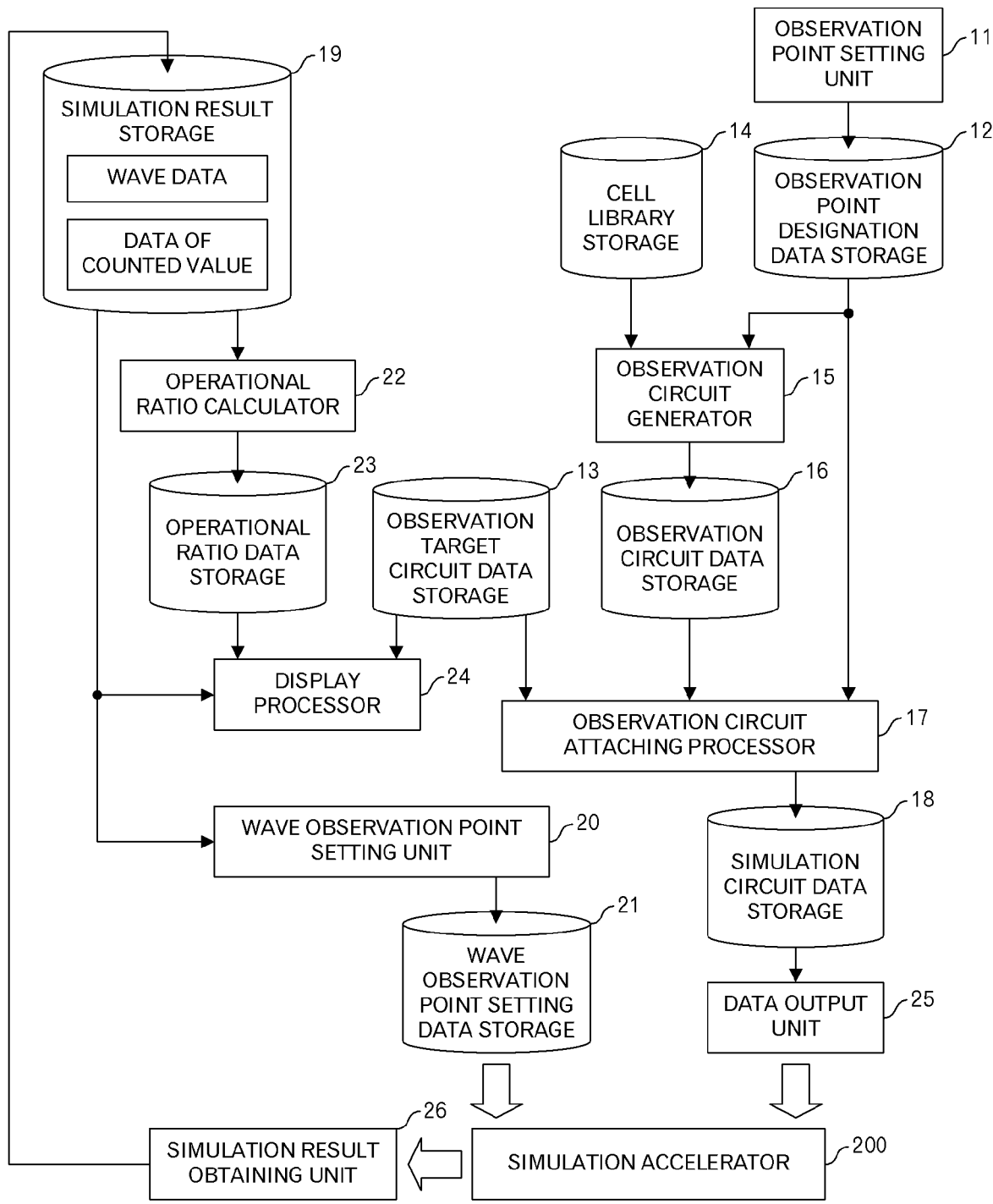
FIG. 1 is a functional block diagram of a semiconductor circuit design support apparatus relating to embodiments.

FIG. 1 depicts a functional block diagram of a semiconductor circuit design support apparatus relating to an embodiment. This semiconductor circuit design support apparatus has an observation point setting unit 11 that designates an individual wiring to be observed in a semiconductor circuit (hereinafter, called an observation target circuit) for which design is carried out or sets a designation rule (including a grouping rule of counter circuits included in observation circuits) of the wirings to be observed; an observation point designation data storage 12 that stores observation point designation data set by the observation point setting unit 11; a cell library storage 14 that stores data of the observation circuit particular in this embodiment, which will be explained later; an observation circuit generator 15 that generates data of the observation circuit by using data stored in the observation point designation data storage 12 and the cell library storage 14; an observation circuit data storage 16 that stores data of the observation circuit generated by the observation circuit generator 15; an observation target circuit data storage 13 that stores data of an observation target circuit; an observation circuit attaching processor 17 that carries out a processing to attach respective observation circuits to the wirings at the observation points in the observation target circuit by using data stored in the observation point designation data storage 12, the observation circuit data storage 16 and the observation target circuit data storage 13; a simulation circuit data storage 18 that stores processing results of the observation circuit attaching processor 17; a data output unit 25 that outputs data stored in the simulation circuit data storage 18 to a simulation accelerator 200; a simulation result obtaining unit 26 that obtains a simulation result from the simulation accelerator 200; a simulation result storage 19 that stores counted values and signal wave data, which are processing results of the simulation accelerator 200; a wave observation point setting unit 20 that carries out a processing to set wave observation points (i.e. wave observation period) by using data (here, counted values) stored in the simulation result storage 19; a wave observation point setting data storage 21 that stores processing results of the wave observation point setting unit 20; an operational ratio calculator 22 that calculates an operational ratio at the wave observation point by using data (here, wave data) stored in the simulation result storage 19; an operational ratio data storage 23 that stores data of operational ratios calculated by the operational ratio calculator 22; and a display processor 24 that carries out a processing to present a user with simulation results in various display modes particular in this embodiment by using data stored in the operational ratio data storage 23, the observation target circuit data storage 13 and the simulation result storage 19.

Incidentally, the simulation accelerator 200 is the same as the conventional one, and outputs the counted values, which are counted by the observation circuits, and outputs wave data for the wirings designated similarly in the conventional arts. The details of the simulation accelerator 200 are well-known, and further explanation is omitted.

Figure 2:
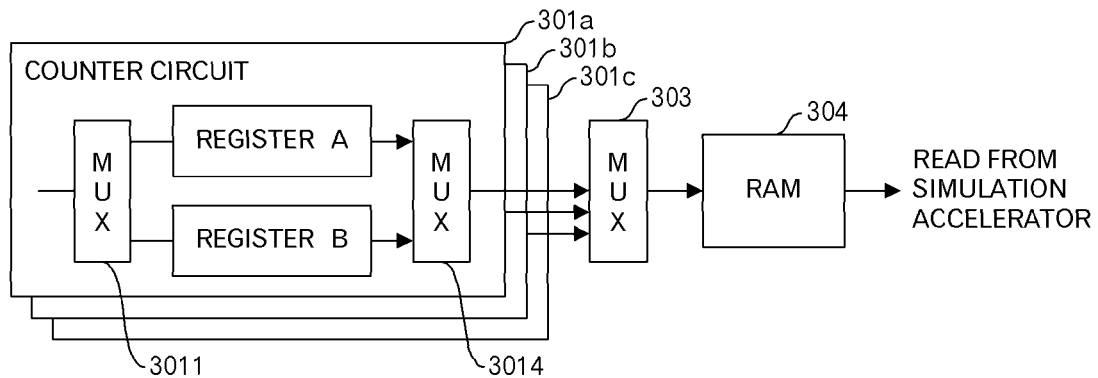
FIG. 2 is a diagram depicting a circuit example of an observation circuit adopted in the embodiments.
Figure 3:
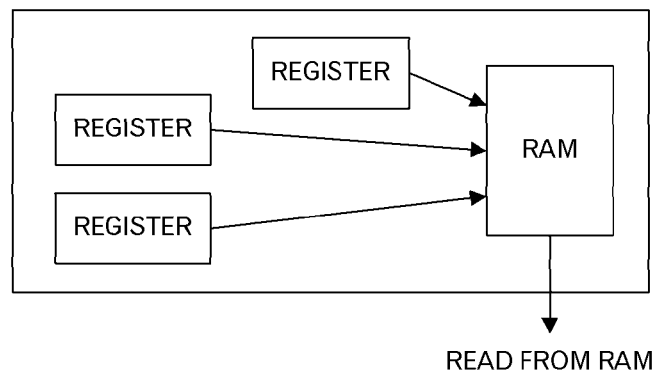
FIG. 3 is a diagram to explain effects of the observation circuit used in the embodiments.

Next, the observation circuit particular in this embodiment will be explained by using FIGS. 2 and 3. In order to resolve the problems of the conventional counter circuit described in the column of the background art, this embodiment adopts the observation circuit as depicted in FIG. 2. Namely, the observation circuit relating to this embodiment has plural counter circuits 301a to 301c respectively connected to the observation points (the number of observation circuits is not limited to "3", although FIG. 2 shows three observation circuits) a multiplexer (MUX) 303 that selects one of outputs of the counter circuits 301a to 301c; and a Random Access Memory (RAM) 304 that stores the counted values, which are received from the counter circuits 301a to 301c through the multiplexer 303. The counted values of the counter circuits 301a to 301c, which are stored in the RAM 304, is read out by the simulation accelerator 200. In addition, the respective counter circuits have a register A that stores an output value in a first period from a counter (not shown) included in the counter circuit; a register B that stores an output value in a second period from the counter (not shown) included in the counter circuit; and a multiplexer (MUX) 3011 that causes the output of the counter to connect to the register A in the first period, and causes the output of the counter to connect to the register B in the second period. Thus, the counter circuit relating to this embodiment adopts a double buffer counter configuration.

(1) In the first period, the counter circuit depicted in FIG. 2 writes the counted value of the counter into the register A and outputs the counted value stored in the register B to the multiplexer 303. (2) The multiplexer 303 selects one of the counter circuits 301a to 303a, which are included in one group, in sequence, and writes the counted value written in the register of the counter circuit 301a to 301c into the RAM 304. (3) In the second period, the counter circuit writes the counted value of the counter into the register B, and outputs the counted value stored in the register A to the multiplexer 303. (4) The multiplexer 303 selects one of the counter circuits 301a to 301c, which are included in one group, in sequence, and writes the counted value written in the register of the counter circuits 301a to 301c into the RAM 304. Such a processing is repeated.

As depicted in FIG. 2, the RAM 304 is adopted in this embodiment. Actually, plural RAMs 304 are disposed on an accelerator board. However, they are gathered more than the registers described in the column of the conventional arts. Thus, as depicted in FIG. 3, by one reading processing (i.e. communication processing), data of about 800K bytes can be collectively read out in about 2 or 3 seconds. When a 32-bit counter is used, data for 0.2 million registers can be read out in about 2 or 3 seconds, because data amount for one register is 4 bytes. Compared with the conventional case that it takes about one to two seconds for one register when directly reading out from the register, it is possible to read out data at very high speed.

In addition, because the RAM 304 on the simulation accelerator 200 does not have such bandwidth that data of 800K bytes can be written at one time, the double buffer counter is adopted as described above. Namely, the registers are switched in the counter circuit, and a method that the counted value is written into RAM 304 in sequence in the time-division manner among the group of the counter circuits is used to efficiently utilize the data writing bandwidth to the RAM 304.

Furthermore, the counter circuits 301a to 301c, which belong to the same group, are connected to the RAM 304, which is the writing destination of them, through the multiplexer 303. The counter circuits 301a to 301c are disposed near the respective observation target signals (i.e. the observation target wirings). Therefore, they are distributedly disposed on the accelerator board. However, it is more efficient that the counted values are written into the RAM 304 from as near counter circuits 301a to 301c as possible. Therefore, in this embodiment, the counter circuits 301a to 301c, which are disposed near the observation target signals (i.e. wirings), are grouped. That the counter circuits are near the observation target signals (i.e. wirings) is determined based on the module group under a specific layer in the observation target circuit.

Thus, because the counted values, which are observation results, can be obtained at high speed by adopting the observation circuits as depicted in FIG. 2, it becomes possible to increase the number of observation points (i.e. observation target wirings).

Figure 4:
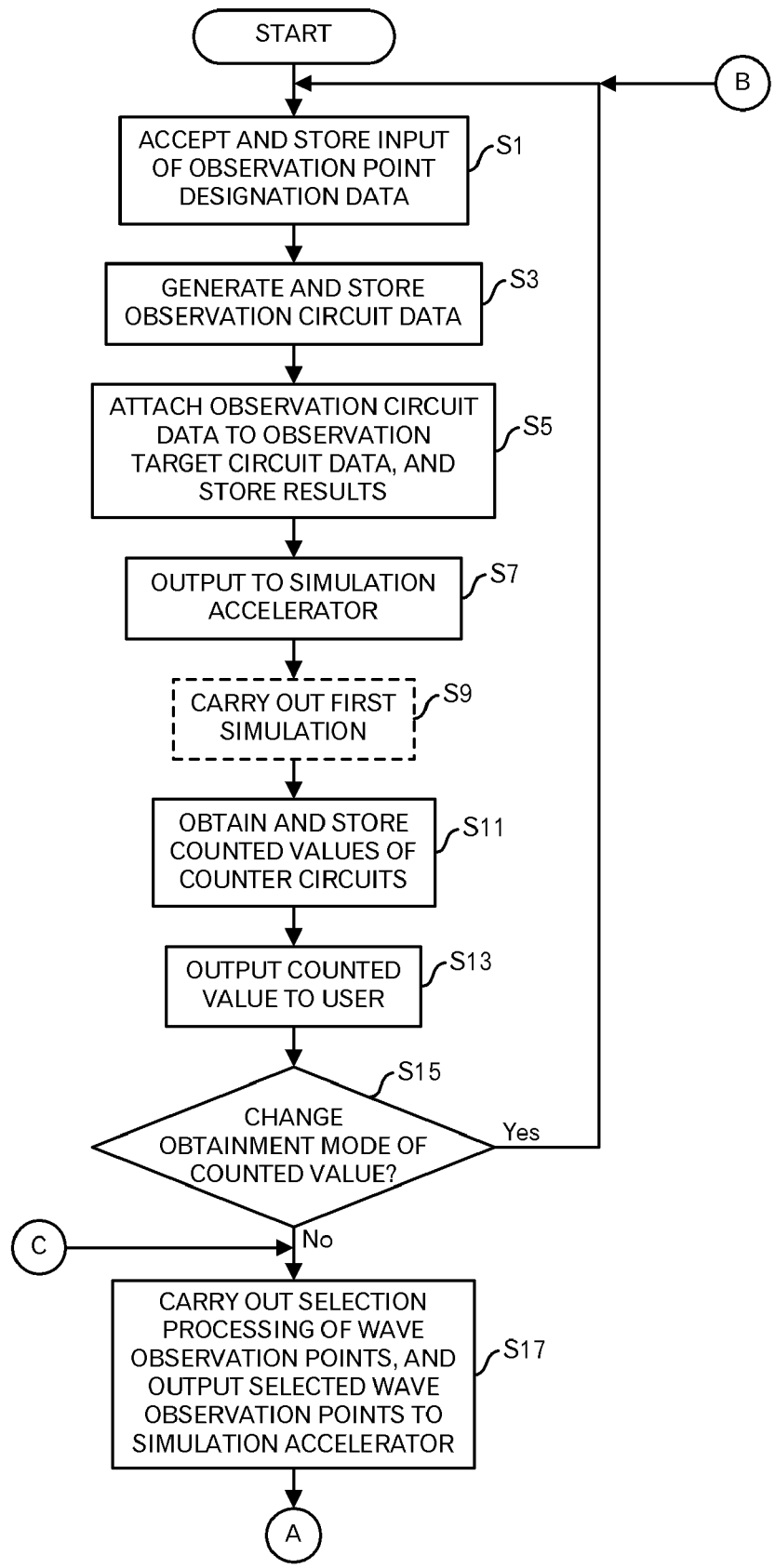
FIG. 4 is a diagram depicting a main processing flow in the embodiments.

Next, processing contents of the semiconductor circuit design support apparatus depicted in FIG. 1 will be explained by using FIGS. 4 to 26. First, the observation point setting unit 11 accepts an input of the observation point designation data from the user, and stores the inputted data into the observation point designation data storage 12 (FIG. 4: step S1). In the conventional art, one characteristic signal such as a clock gating signal or chip enable signal is selected. This is because there is a problem of the data collection time from the observation circuit as described above. On the other hand, in this embodiment, a lot of observation points can be designated by adopting the aforementioned observation circuits. For example, the observation points as depicted in FIGS. 5 to 9 can be designated.

(a) Various States of RAM

Figure 5:
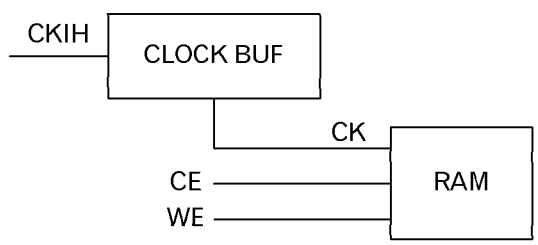
FIG. 5 is diagram depicting an example of signals necessary to observe states of RAM.
Figures 6, 7, 8, 9:
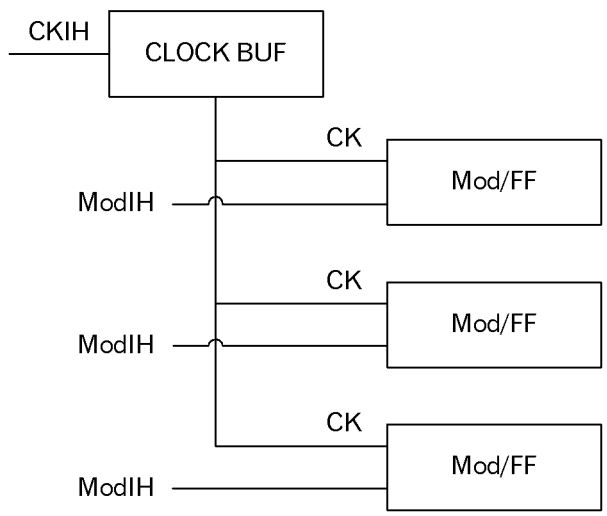
FIG. 6 is a diagram depicting a combination of signals to identify states of RAM.
FIG. 7 is a diagram depicting an example of signals necessary to observe states of modules or Flip Flops (FFs)
FIG. 8 is a diagram depicting a combination of signals to identify states of the modules or FFs.
FIG. 9 is a diagram depicting a combination of states of the respective modules to identify states of the module combination.

As schematically depicted in FIG. 5, a chip enable signal (CE) a write enable signal (WE) and a clock signal (CK) are inputted to the RAM, and in order to identify the state of the RAM, a clock provision stop signal (CKIH) to the upper-level clock source (Clock BUF) in addition to the chip enable signal and the write enable signal should be observed. By the combination of three-signal states, one state of stop, waiting and reading and writing can be identified as depicted in FIG. 6. Incidentally, in FIG. 6, "x" represents either "0" or "1". In this embodiment, how many times the respective states occur is observed.

(b) Clock Gating and Inh Signal of Logic Module and Flip Flop (FF)

As depicted in FIG. 7, a clock signal (CK) and ModIH signal to stop the operation of the logic module or single FF are inputted into the respective logic modules (Mod) and FF, and in order to identify the state of the respective logic modules and FF, the clock provision stop signal (CKIH) to the upper-level clock source (Clock BUF) in addition to the ModIH signal should be observed. Incidentally, when the operation of the logic module or FF is stopped by the CKIH signal, it is possible to reduce much power consumption. However, it takes longer time to activate them again. On the other hand, when the operation is stopped by the ModIH signal, the power consumption cannot be so reduced. However, they can be activated soon.

By the combination of two-signal states, one state of "stop", "activate" and "operate" for the respective logic modules or FFs is identified as depicted in FIG. 8. In this embodiment, how many times the respective states occur is observed.

(c) Combination of Logic Modules or FFs

In this embodiment, as depicted in FIG. 9, 9 states such as simultaneously operating, one module operating, simultaneously stopped, and the like can further be observed for the respective combinations of neighboring modules or the like, for example (it is assumed that the modules and/or FF in one array element are "neighbor" when the chip is divided into array elements on the implementation layout.). Specifically, by observing the CKIH signal and ModIH signal of a module A and the CKIH signal and ModIH signal of a module B, one of the 9 states as depicted in FIG. 9 is identified to observe how may cycles the states occur. For example, in a case of the CKIH signal=0 and ModIH signal=0 of the module A and the CKIH signal=0 and ModID signal=0 of the module B, a state "simultaneously operating" is identified.

Incidentally, as the designation method of the observation points, a method of designating, as the observation points, all RAMs and/or modules on and under a specific layer according to the layer definition of the observation target circuit maybe adopted. For example, when the layer definition such as the entire chip, processor core, second cache unit, and cache controller from the top layer is made, all modules and the like on and under the fourth layer in such layer structure may be designated as the observation unit. Otherwise, when the module names are assigned according to a predetermined rule, all modules whose name matches with a designated module name may be designated as the observation points.

Furthermore, when the user knows the details of the observation target circuit, he or she may designate the individual modules. In addition, the user may select one of typical observation point templates, which are prepared in advance.

The observation point setting unit 11 accepts such designation of the observation points, and stores designation data of the observation points into the observation point designation data storage 12.

Next, the observation circuit generator 15 generates the observation circuits according to the data designating the observation points, which is stored in the observation point designation data storage 12, by using data of the observation circuit as depicted in FIG. 2, which is stored in the cell library storage 14, and stores data (i.e. net list) of the generated observation circuits into the observation circuit data storage 16 (step S3). At this step, a processing to prepare the necessary counter circuits in the observation circuits, according to the data designating the observation points, and to group them and the like is carried out. The grouping is carried out for each logic unit belonging to a layer immediately below the layer designated as the observation points, for example.

Figure 10:
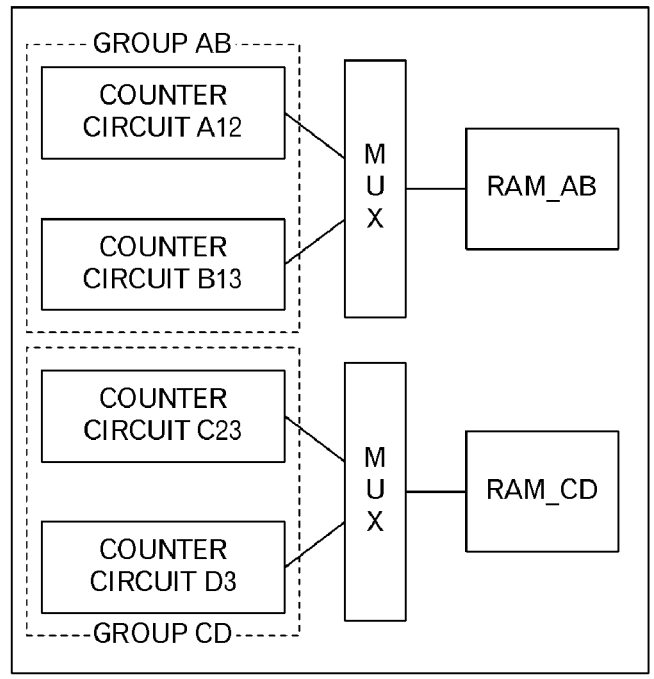
FIG. 10 is a diagram schematically depicting the observation circuit to be generated.

For example, when the modules A and B in the observation target circuit belong to the same logic unit, one group as a group AB is made for the modules A and B, and when the modules C and D in the observation target circuit belong to the same logic unit, one group as a group CD is made for the modules C and D. Then, when two wirings 1 and 2 in the module A are identified as wirings whose states should be observed, a counter circuit A12 for those wirings is prepared. In addition, when two wirings 1 and 3 in the module B are identified as wirings whose states should be observed, a counter circuit B13 for those wirings is prepared. Then, because the modules A and B belong to one group AB, an observation circuit including the counter circuits A12 and B13, a RAM_AB for this group AB and a multiplexer (MUX) connecting them are prepared. Moreover, when two wirings 2 and 3 in the module C are identified as wirings whose states should be observed, a counter circuit C23 for those wirings is prepared. In addition, when a wiring 3 in the module D is identified as a wiring whose states should be observed, a counter circuit D3 for those wirings is prepared. Then, because the modules C and D belong to one group CD, an observation circuit including the counter circuits C23 and D3, a RAM_CD for this group CD and a multiplexer (MUX) connecting them are prepared. FIG. 10 schematically depicts the observation circuits prepared as described above. Incidentally, a circuit for controlling the observation circuits and a circuit for reading out data from the RAM are also attached.

Then, the observation circuit attaching processor 17 carries out a processing to attach the data of the observation circuits, which is stored in the observation circuit data storage 16, to data (i.e. net list) of the observation target circuit, which is stored in the observation target circuit data storage 13, according to the data designating the observation points, which is stored in the observation point designation data storage 12 (step S5).

Figure 11:
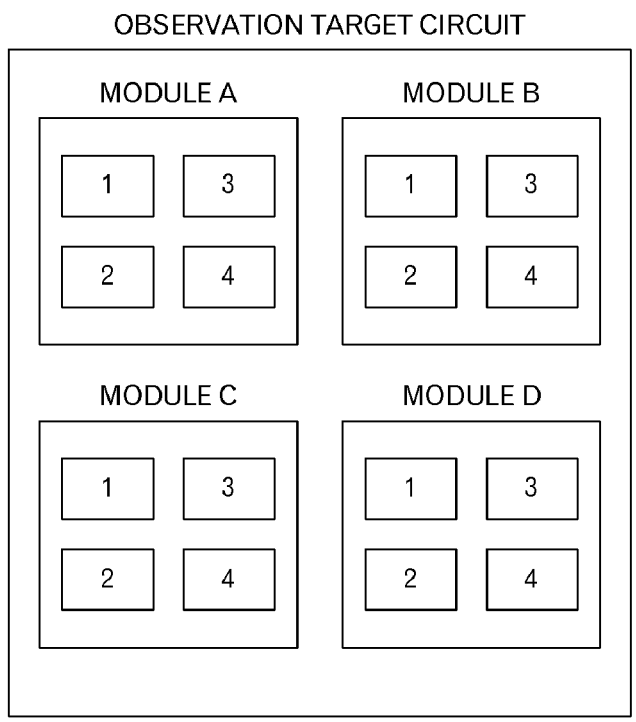
FIG. 11 is a diagram schematically depicting an observation target circuit.
Figure 12:
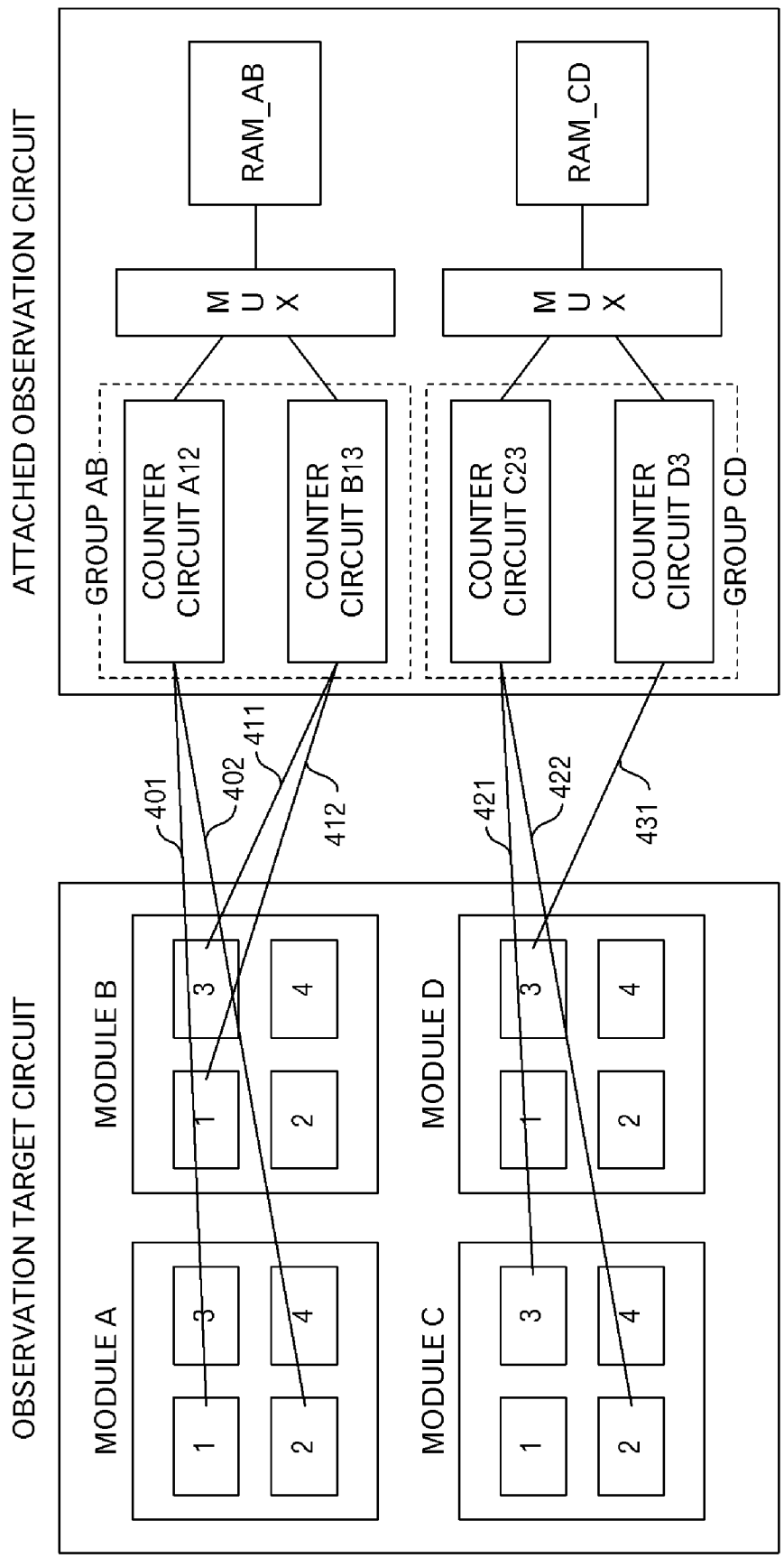
FIG. 12 is a diagram schematically depicting circuit data for simulation.

For example, when the observation target circuit as schematically depicted in FIG. 11 is used, wirings 1 and 2 of a module A, wirings 1 and 3 of a module B, wirings 2 and 3 of a module C and a wiring 3 of a module D are identified as probing points by the data designation the observation points. Then, by connecting the counter circuits of the observation circuits as depicted in FIG. 10 and the probing points in the observation target circuit by probe signal lines, attaching the observation circuits to the data of the observation target circuit is realized. This state is depicted in FIG. 12, schematically. Probe signal lines 401 and 402 connecting the counter circuit A12 to the observation target circuit, probe signal lines 411 and 412 connecting the counter circuit B13 to the observation target circuit, probe signal lines 421 and 422 connecting the counter circuit C23 to the observation target circuit and a probe signal line 431 connecting the counter circuit D3 to the observation target circuit are defined. As depicted in FIG. 12, data of the circuits in which the observation target circuit and the observation circuits are merged is stored into the simulation circuit data storage 18.

Then, the data output unit 25 outputs the circuit data stored in the simulation circuit data storage 18 to the simulation accelerator 200 (step S7).

The simulation accelerator 200 carries out a well-known simulation (i.e. a first simulation) by using the circuit data received from the data output unit 25, and outputs the counted values counted by the aforementioned observation circuits from the RAMs of the observation circuits (step S9). The simulation accelerator 200 accurately simulates how the logic in the chip operates for the clock cycle unit when a certain input pattern is given to the logic. In FIG. 4, the block of the step S9 is represented by a dotted line, because this processing is carried out by a unit other than the semiconductor circuit design support apparatus.

The simulation result obtaining unit 26 obtains the counted values, as the results of the first simulation, from the simulation accelerator 200, and stores them into the simulation result storage 19 (step S11).

Figures 13, 14:
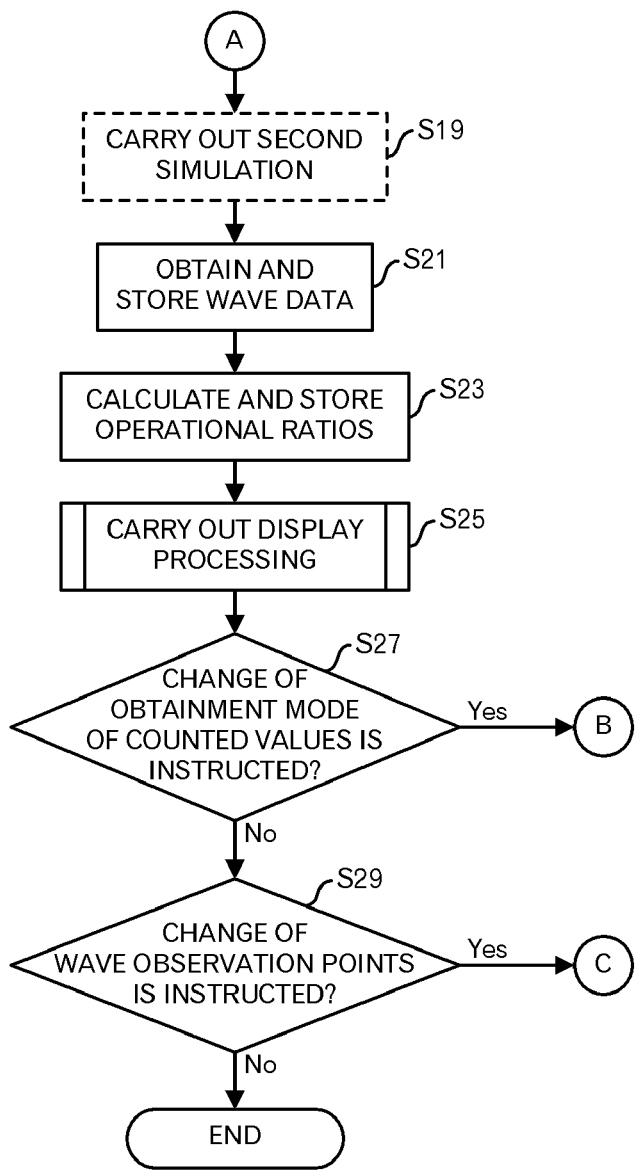
FIG. 13 is a diagram depicting an example of count results by a simulation accelerator.
FIG. 14 is a diagram depicting a main processing flow in the embodiments.
Figure 16:
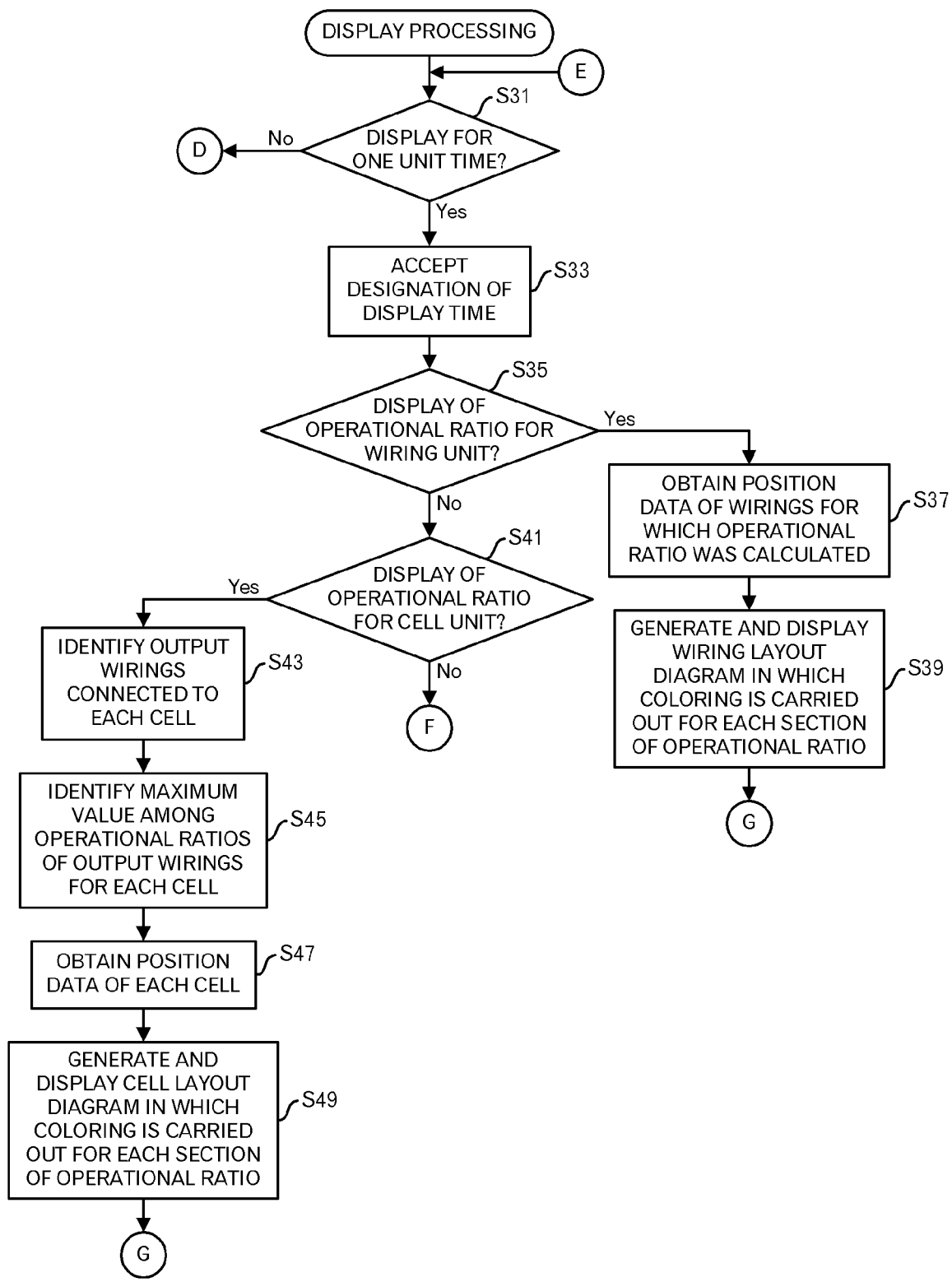
FIG. 16 is a diagram depicting a processing flow of a display processing.

One example of the counted values is depicted in FIG. 13. In the example of FIG. 13, the number of cycles in a state satisfying CKIH=0, CE=1 and WE=1 for Move-In-Data register in a second cache controller, namely, in a writing state, are enumerated for each 60 thousand cycles. That is, 832 cycles are in the wiring state among the first 60 thousand cycles, and 1216 cycles are in the wiring state among the next 60 thousand cycles.

Next, the wave observation point setting unit 20 presents the user with the counted values and the like, which are stored in the simulation result storage 19 (step S13). At this step, the counted values themselves may be presented, and a graph representing change of the counted values of specific operating states with respect to time, for example, for modules designated by the user or the like may be generated and presented to the user. Furthermore, a graph representing the change of the total value of the counted values of the specific operating state with respect to time, for example, for all modules designated by the user may be generated and presented to the user. Here, the user investigates, for example, whether or not there is any trouble in obtaining the counted values, and/or whether or not the modules to be observed should be further narrowed. If necessary, an instruction to change the mode of obtaining the counted values is inputted into the observation point setting unit 11.

When the observation point setting unit 11 accepts the instruction to change the mode of obtaining the counted values from the user (step S15: Yes route), the processing returns to the step S1.

On the other hand, when any instruction to change the mode of obtaining the counted values is not accepted (step S15: No route) the wave observation point setting unit 20 carries out a processing to select the wave observation points, and stores data of the selected wave observation points into the wave observation point setting data storage 21, and further output the data to the simulation accelerator 200 (step S17). In this processing to select the wave observation points, for example, the counted values of the designated state (e.g. operating state) are totaled for one or plural modules designated by the user or all modules from which the counted values are obtained, to generate data representing the change of the total counted value with respect to time. Then, one or plural periods whose total counted value is greater than a predetermined reference are identified among plural periods in the change of time. For example, after automatically identifying the periods whose total counted value is greater than the predetermined reference and presenting the user with the identified periods, the user may designate periods for the wave observation points. Moreover, the periods for the wave observation points may be automatically identified, or after presenting the user with data representing the change of the total counted values with respect to time, the user may designate the periods. Furthermore, by paying attention to the change ratio of the counted values, portions whose change ratio is greater may be designated as the wave observation points. In addition, the peak of the change of the counted values with respect to time may be identified to designate the period at the peak predetermined periods before and after the peak as the wave observation points. The processing shifts to a processing of FIG. 14 through a terminal A.

Shifting to the explanation of the processing of FIG. 14, the simulation accelerator 200 carries out a second simulation (step S19). In this second simulation, a well-known processing to obtain the wave data at the designated wave observation points is simultaneously executed. In FIG. 14, the block of the step S19 is represented by a dotted line because this processing is carried out by a unit other than the semiconductor circuit design support apparatus.

The simulation result obtaining unit 26 obtains wave data of the respective signals at the wave observation points as the results of the second simulation from the simulation accelerator 200, and stores the obtained wave data into the simulation result storage 19 (step S21). The wave data is data of signal values in the respective cycles.

Then, the operational ratio calculator 22 calculates the operational ratio (which relates to the number of reversal times of the signal value per unit time) by identifying the number of reversal times of the respective signal value during a predetermined time (the predetermined number of cycles) from the wave data stored in the simulation result storage 19, and stores the operational ratio into the operational ratio data storage 23 (step S23). The calculation of the operational ratio is well-known, and the detailed explanation is omitted. The operational ratio data storage 23 stores data as depicted in FIG. 15, for example. In the example of FIG. 15, for each signal, the number of times of the signal change, which represents the number of reversal times of the signal value and the operational ratio are stored.

Then, the display processor 24 carries out a display processing according to the user's request by using data stored in the operational data storage 23 and, if necessary, data of the counted values, which is stored in the simulation result storage 19 (step S25). This display processing will be explained by using FIGS. 16 to 26.

The display processor 24 judges whether or not an instruction from the user requests the display for one unit time (step S31). Not only displaying data such as the operational ratio for a specific unit time, simply, but also displaying the change of the operational ratio with respect to time and the like in an animation manner may be selected. Therefore, it is judged which display mode is selected, here.

Figure 24:
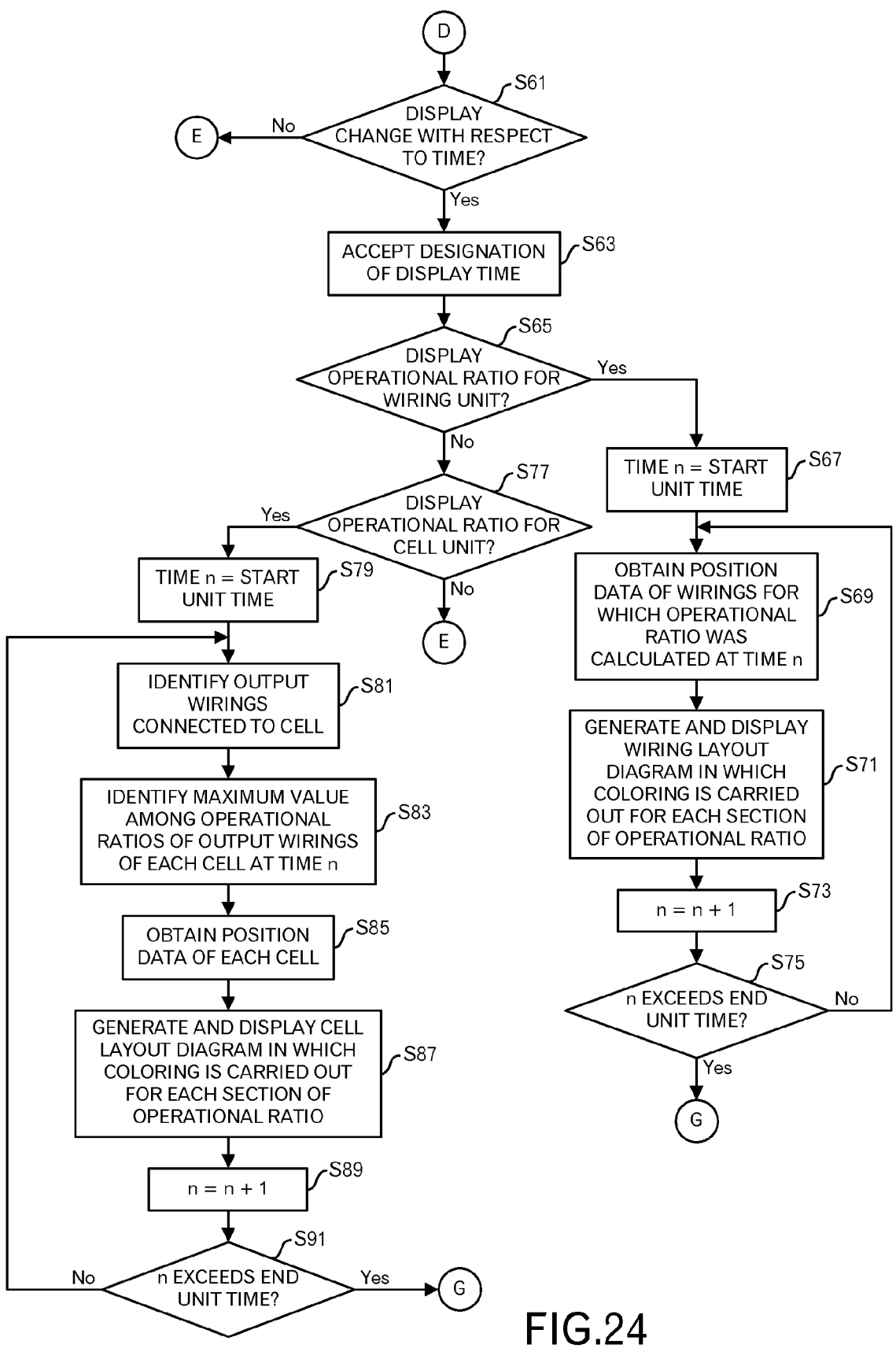
FIG. 24 is a diagram depicting a processing flow of a display processing.

When displaying data for one unit time is not selected, the processing shifts to a processing of FIG. 24 through a terminal D. On the other hand, when displaying data for one unit time is requested, the display processor 24 accepts designation of the time (i.e. unit time) to be displayed from the user (step S33). Furthermore, the display processor 24 judges whether or not the instruction of the display mode from the user requests displaying the operational ratio for the respective wirings (step S35).

When the instruction of the display mode from the user requests displaying the operational ratio for the respective wirings, the display processor 24 obtains position data of the wirings, for which the operational ratio has been calculated, on the chip, from the layout data of the observation target circuit, which is stored in the observation target circuit data storage 13, and stores the obtained position data into a storage device such as a main memory (step S37). For example, data as depicted in FIGS. 17 to 19 is stored as the layout data in the observation target circuit data storage 13. In the example of FIG. 17, for each logic module, names of input wirings and output wirings, which are connected to the logic module, are registered. In addition, for each wiring, coordinate values (e.g. coordinate values of the starting point and ending point, or the like) of the wiring are registered. Moreover, in the example of FIG. 19, for each logic module, coordinate values (e.g. coordinate values of an upper left point and lower right point or the like) of the logic module are registered. At the step S37, the coordinate values of each wiring are obtained as the position data.

Figure 20:
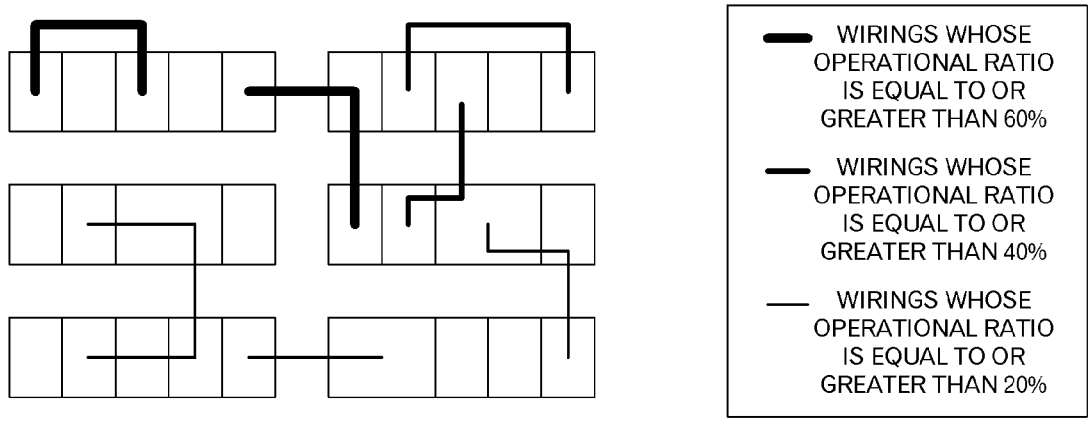
FIG. 20 is a diagram depicting a display example of the operational ratio for each wiring.

Then, the display processor 24 generates a wiring layout diagram on which coloring or the like (brightness or thickness of the lines may be differentiated) is carried out for each section (i.e. range) of the operational ratio, and displays the diagram on a display device (step S39). For example, the wiring layout diagram as depicted in FIG. 20is displayed. In the example of FIG. 20, the rectangle represents a logic module (i.e. cell), and a level of the operational ratio is represented by the thickness of the wiring connecting between the logic modules. Incidentally, display of the wirings whose operation ratio is less than 20% is omitted in the example of FIG. 20. By carrying out the display as depicted in FIG. 20, it becomes possible to grasp at which wiring the operational ratio is high, in addition to the positional relationship. In addition, it becomes possible to also pay attention to the logic modules connected to the wirings whose operational ratio is high. The processing shifts to a step S59 through a terminal G.

On the other hand, when the instruction from the user does not request displaying the operational ratio for the respective wiring, the display processor 24 judges whether or not the instruction of the display mode from the user requests displaying the operational ratio for the respective cells (i.e. logic module unit) (step S41). When the instruction of the display mode from the user requests displaying the operational ratio for the respective cells, the display processor 24 identifies output wirings connected to the respective cells from data (e.g. data as depicted in FIG. 17) of the observation target circuit, which is stored in the observation target circuit data storage 13 (step S43), identifies, for each cell, the maximum value among the operational ratios of the output wirings of the cell from data stored in the operational data storage 23, and stores the identified maximum value into the storage device such as the main memory in association with the pertinent cell. For example, when three output wirings are connected with a certain cell, the operational ratio of the output wiring whose operational ratio is the maximum among three wirings is considered to be the operational ratio of the certain cell.

Figure 21:
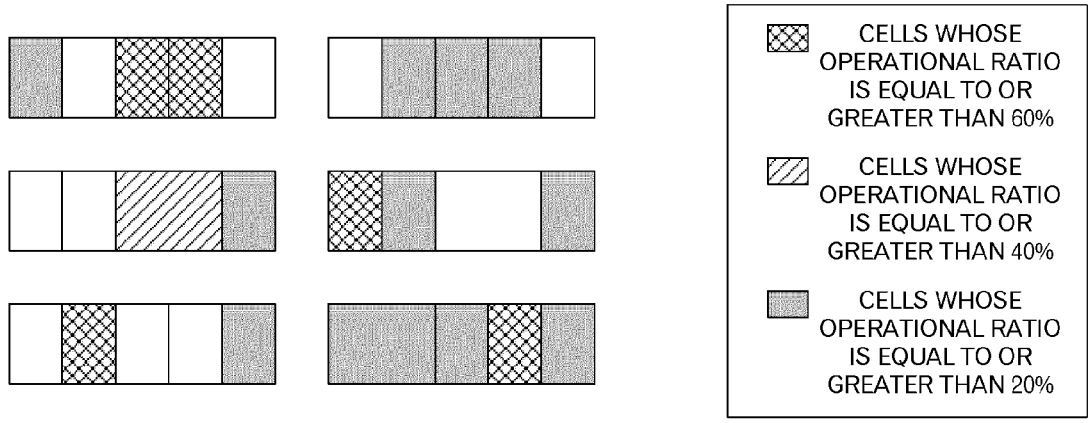
FIG. 21 is a diagram depicting a display example of the operational ratio for each cell.

Furthermore, the display processor 24 obtains position data of each cell, from the layout data (e.g. FIG. 19) of the observation target circuit, which is stored in the observation target circuit data storage 13, and stores the obtained position data into the storage device such as the main memory in association with the pertinent cell (step S47). Then, the display processor 24 generates a cell layout diagram in which coloring (or the density or type of the hatching may be differentiated or the like) is carried out for each section (i.e. range) of the operational ratio, and displays the cell layout diagram on the display device (step S49). For example, the cell layout diagram as depicted in FIG. 21 is displayed. In the example of FIG. 21, each rectangle represents each cell, and a level of the operational ratio is represented by the density of the hatching. Incidentally, as for the cell whose operational ratio is less than 20%, no hatching is attached in the example of FIG. 21. By carrying out such display, it becomes easy to understand positional maldistribution of the cells whose operational ratio is high. The processing shifts to the step S59 through the terminal G.

Figure 22:
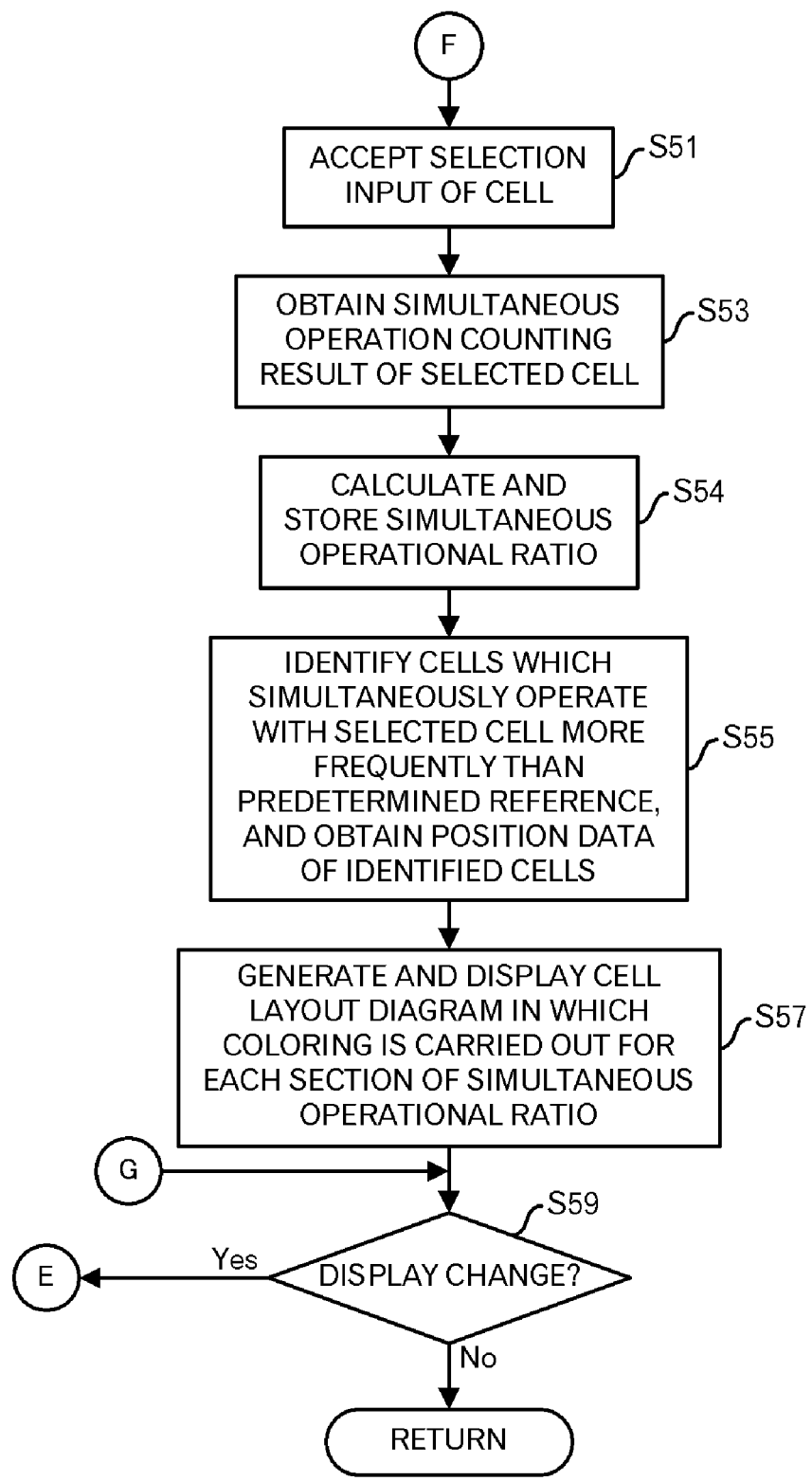
FIG. 22 is a diagram depicting a display example of the operational ratio for each cell.

In addition, when the instruction from the user does not request displaying the operational ratio for the respective cells, the processing shifts to the processing of FIG. 22 through a terminal G. Here, this implies that displaying the simultaneous operational ratio for a specific cell and a cell, which simultaneously operates with the specific cell, is selected. Therefore, first, the display processor 24 accepts a selection input of a cell to be processed (step S51), and reads out counting results of the number of simultaneous operating times for the selected cell, for example, (incidentally, the counted value for other states may be used.) from the simulation result storage 19 (step S53). As depicted in FIG. 9, the number of times that a state occurs (i.e. state 9 in FIG. 9) in which two cells simultaneously operate is counted. Therefore, the counted value for such a simultaneous operating state is obtained. Incidentally, the counted value in the display time designated at the step S33 is extracted. Furthermore, the display processor 24 calculates the simultaneous operational ratio by (the counted value/the number of cycles in the designated unit time) for the respective other cells observed in association with the specific cell, and stores the calculated simultaneous operational ratios into the storage device such as the main memory (step S54).

Figure 23:
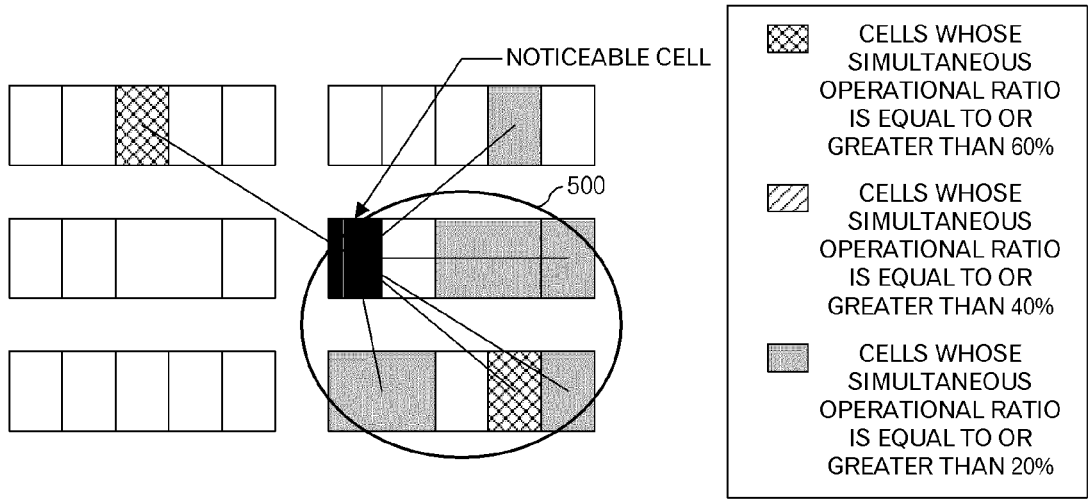
FIG. 23 is a diagram depicting a display example of a simultaneous operational ratio of a cell.

After that, the display processor 24 reads out position data of the selected cell and the cell observed in association with the selected cell, and stores the obtained position data into the observation target circuit data storage 13 (FIG. 19) (step S55). Then, the display processor 24 generates a cell layout diagram in which coloring (the density or type of the hatching or the like may be differentiated.) or the like is carried out according to the sections (i.e. ranges) of the simultaneous operational ratio, and displays the cell layout diagram on the display device (step S57). For example, the cell layout diagram as depicted in FIG. 23 is displayed. In the example of FIG. 23, the rectangle represents a cell, and the black-painted cell represents the selected cell. Then, the level of the simultaneous operational ratios of other cells observed in association with the selected cell is represented by the density of the hatching. When the simultaneous operational ratio is less than 20%, no hatching is displayed. In addition, a line representing the association between the selected cell and the cell whose simultaneous operational ratio is equal to or greater than 20% is depicted. However, such a line may not be displayed. An ellipse 500 represents a portion in which a group of cells whose simultaneous operational ratio is relatively high in association with the selected cell exists, and it can be understood that the simultaneously operating cells concentrate locally.

Although it is not depicted in the processing flow, the change with respect to time on the screen as depicted in FIG. 23 may be displayed applying a processing described below.

Then, the display processor 24 judges whether or not the display change is instructed by the user (step S59). When the display change is instructed, the processing returns to the step S31 through the terminal E. On the other hand, when the display change is not carried out, the processing returns to the original processing.

In addition, when it is judged at the step S31 that the instruction from the user does not request displaying data for one unit time, the display processor 24 judges whether or not displaying the change of the operational ratio with respect to the time in the animation manner is requested from the user (step S61). When displaying the change of the operational ratio with respect to the time in the animation manner is not requested, the processing returns to the step S31 through the terminal E. On the other hand, when it is judged that displaying the change of the operational ratio with respect to the time is requested, the display processor 24 accepts designation of the time to be processed from the user (step S63). For example, the designation of the start unit time and end unit time is accepted. Then, the display processor 24 judges whether or not the instruction of the display mode from the user requests displaying the operational ratio for the respective wirings (step S65).

When the instruction of the display mode from the user requests displaying the operational ratio for the respective wiring, the display processor 24 sets the designated start unit time to a time "n" (step S67). After that, the display processor 24 obtains position data of the wirings whose operational ratio at the time "n" has been calculated, on the chip from the layout data of the observation target circuit, which is stored in the observation target circuit data storage 13, and stores the obtained position data into the storage device such as the main memory (step S69).

Figure 25:
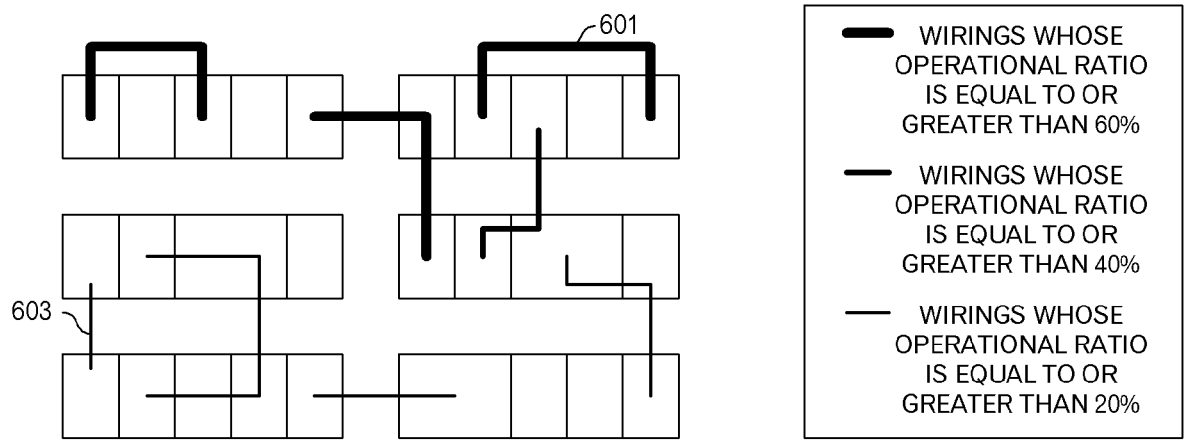
FIG. 25 is a diagram depicting another display example of the operational ratio for each wiring.

Then, the display processor 24 generates a wiring layout diagram in which coloring (or the brightness or thickness of the line may be differentiated.) or the like is carried out for each section (i.e. range) of the operational ratio, and displays the wiring layout diagram on the display device (step S71). For example, the wiring layout diagram as depicted in FIG. 20 is displayed. Then, when the time "n" is incremented by 1 (step S73), the display processor 24 judges whether or not the time "n" exceeded the end unit time (step S75). When the time "n" does not exceed the end unit time, the processing returns to the step S69, and then the steps are carried out again. Then, at the next step S71, a screen as depicted in FIG. 25 is displayed. As depicted in FIG. 25, the operational ratio of a wiring 601 increases in the unit time next to FIG. 20. In addition, it can be grasped that a wiring 603 whose operational ratio newly exceeds 20% exists. By grasping the position of the wirings whose operational ratio is changed, and/or confirming the position of the wirings whose operational ratio newly exceeds 20%, it becomes easy to grasp the change of the operational ratio with respect to the time and/or the positional movement of the wirings whose operational ratio is high.

At the step S75, when it is judged that the time "n" exceeds the end unit time, the processing shifts to the step S59 through the terminal G.

On the other hand, when the instruction does not request displaying the operational ratio for the respective wirings, the display processor 24 judges whether or not the instruction of the display mode from the user requests displaying the operational ratio for the respective cells (i.e. for the respective logic modules) (step S77). When the instruction of the display mode from the user does not request displaying the operational ratio for the respective cells, the processing returns to the step S31 in FIG. 16 through the terminal E. When the instruction of the display mode from the user requests displaying the operational ratio for the respective cells, the display processor 24 sets the designated start unit time to the time "n" (step S79). Furthermore, the display processor 24 identifies output wirings connected to each cell from the data (e.g. data as depicted in FIG. 17) of the observation target circuit, which is stored in the observation target circuit data storage 13 (step S81), and identifies, for each cell, the maximum value among the operational ratios of the output wirings of the cell, and stores the maximum values into the storage device such as the main memory in association with the pertinent cell (step S83). For example, when three wirings are connected to a certain cell, it is considered that the operational ratio of one output wiring whose operational ratio is the maximum among the three wirings is the operational ratio of the certain cell.

Furthermore, the display processor 24 obtains position data of each cell from the layout data (e.g. FIG. 19) of the observation target circuit, which is stored in the observation target circuit data storage 13, and stores the obtained position data into the storage device such as the main memory in association with the pertinent cell (step S85). Then, the display processor 24 generates a cell layout diagram in which coloring (the density or type of the hatching may be differentiated) for each section of the operational ratio, and stores the cell layout diagram on the display device (step S87). For example, the cell layout diagram as depicted in FIG. 21 is displayed.

Figure 26:
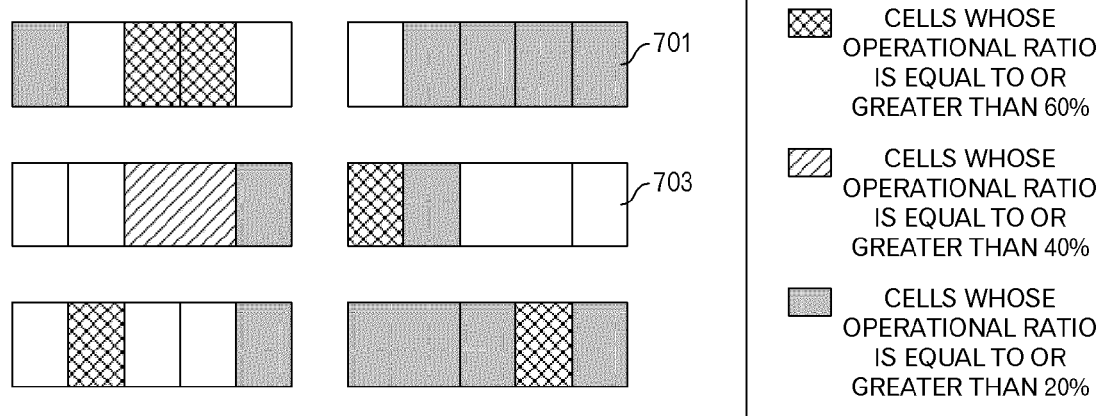
FIG. 26 is a diagram depicting still another display example of the operational ratio for each cell.

Here, the display processor 24 increments the time "n" by 1 (step S89), and judges whether or not the time "n" exceeds the end unit time (step S91). When the time "n" exceeds the end unit time, the processing returns to the step S81, and the processing is carried out again. The, a screen as depicted in FIG. 26 is displayed at the next step S87. As depicted in FIG. 26, in the unit time next to FIG. 21, it can be grasped that a cell 701 whose operational ratio rapidly increases and a cell 703 whose operational ratio becomes less than 20% exist. Thus, it becomes possible to grasp the position of cells whose operational ratio changes, the change of the maldistribution of the cells whose operational ratio is high with respect to the time and the like.

Then, when it is judged at the step S91, that the time "n" exceeds the end unit time, the processing shifts to the step S59 through the terminal G.

Returning to the explanation of the processing of FIG. 14, the user refers to the result of the display processing. Then, the display processor 24 judges whether or not the user instructs the observation point setting unit 11 to change the obtaining mode of the counted values (step S27). When the change of the obtaining mode of the counted value is instructed, the processing returns to the step S1 of FIG. 4 through the terminal B. On the other hand, when the change of the obtaining mode of the counted value is not instructed, the wave observation point setting unit 20 judges whether or not the change of the wave observation points is instructed from the user (step S29). When the change of the wave observation point is instructed from the user, the processing returns to the step S17 through the terminal C. On the other hand, when the change of the wave observation points is not instructed from the user, the processing is terminated.

By carrying out the aforementioned processing, (1) because the data obtainment from the observation circuits can be carried out at high speed, it is possible to obtain the occurrence frequencies of many operation states of many cells in the observation target circuit. In addition, (2) because an enormous amount of data can be visualized in detail, it is possible to carry out various feedbacks for the designer based on the enormous amount of data to lead to the efficient design and/or the discovery of problems. (3) Because an enormous amount of data can be presented in various modes to the designer, the designer can intuitively obtain necessary information.

More specifically, it becomes possible to easily grasp the local operations in the chip, which cannot be grasped by the designer using the conventional arts. Then, by grasping the local operations, it becomes possible to identify modules which causes the temporal and/or spatial maldistribution of the power consumption and/or heat generation, and to easily carry out the optimization of the implementation and/or logic in order to suppress the local heat generation and/or fluctuation of the power consumption, which causes the abnormal operations.

Although the embodiments are explained above, this technique is not limited to those embodiments. For example, the aforementioned display screen examples are mere examples, and a screen, which includes the same or similar contents, may be displayed in a mode easy to understand. Especially, the coloring and the like is effective. In addition, the sectioning of the operational ratio can be arbitrarily carried out and is not limited to the aforementioned example.

Moreover, the functional block diagram depicted in FIG. 1 is a mere example, and does not always correspond to an actual program module configuration.

As for the processing flow, as long as the processing contents are the same, it is possible to change the processing order or execute the steps in parallel.

Furthermore, the aforementioned embodiments can be summarized into four aspects.

A semiconductor circuit design support method relating to a first aspect includes: accepting designation of observation points in an observation target circuit in which operational observation is carried out in simulation, and storing data relating to the designation of the observation points into a storage device; and attaching circuit data of an observation circuit to circuit data of the observation target circuit, which is stored in an observation target circuit data storage device, so that the observation circuit is connected to the observation target circuit according to the data relating to the designation of the observation points, which is stored in the storage device, and storing the circuit data of the observation target circuit, which includes the circuit data of the observation circuit, into a simulation data storage device.

In this aspect, the aforementioned observation circuit has a plurality of counter circuits each having a first register that stores the number of occurrence times of a specific state at a specific observation point during a first period, a second register that stores the number of occurrence times of the specific state at the specific observation point during a second period, and a switching circuit that causes to output the number of occurrence times, which is stored in the second register, during the first period and causes to output the number of occurrence times, which is stored in the first register, during the second period; a memory that stores the numbers of occurrence times; and an output switching circuit that selects one of outputs of the plurality of counter circuits to cause to write the number of occurrence times into the memory.

By adopting such an observation circuit, the data obtainment from the simulator is carried out at high speed, and it becomes possible to obtain the aforementioned numbers of occurrence times for a lot of observation points. Furthermore, it becomes possible to carry out various data analysis by using the obtained data and support the semiconductor circuit design by the designer.

Incidentally, the aforementioned plurality of counter circuits may be identified from data, which is included in data relating to designation of the observation points, and defines a unit of the observation points. For example, by grouping the observation circuits for the neighboring modules, and writing the numbers of occurrence times into the memory in a time-division manner, the data obtainment can be carried out at high speed.

In addition, the aforementioned data relating to the designation of the observation points may include designation data of a specific layer in a hierarchical configuration of the observation target circuit. Thus, it is possible for the designer to easily designate the observation points. According to this feature, the observation points can be exhaustively designated. For example, the number of occurrence times can be obtained from all modules and the like under the specific layer. However, it is possible that the designer particularly designates the individual modules.

Furthermore, the aforementioned specific state may include a stop state, a waiting state, a reading state or a writing state of a RAM, a stop state, a waiting state or an operating state of a module, or a state combination of a plurality of modules. In the conventional arts, the state combination of the plurality of modules cannot be handled, because a lot of signal wirings should be observed. However, according to the feature, various observations can be carried out.

A semiconductor circuit design support method relating to a second aspect includes: reading out data of an operational ratio for a selected wiring to be processed from an operational ratio data storage device storing data of the operational ratios for specific wirings in an observation target circuits for which operations are observed in simulation; reading out position data of the selected wiring from an observation target circuit data storage device storing, for each wiring, position data on a semiconductor chip on which the observation target circuit is implemented; and generating and outputting image data in which display data corresponding to the operational ratio of the selected wiring is disposed according to the position data of the selected wiring on a display area corresponding to the semiconductor chip.

By presenting the designer with such screen data, it becomes possible for the designer to easily grasp the plane maldistribution of the operational ratios of the wirings at a specific time. Namely, it becomes possible to grasp the maldistribution of the power consumption and the like to improve the arrangement.

Furthermore, the aforementioned display data may have a color, brightness or thickness, which is predetermined for a section pertinent to the operational ratio for the selected wiring among a plurality of sections predefined for the operational ratio. Thus, it becomes more comprehensible.

Furthermore, the aforementioned operational ratio data storage device may store data of the operational ratios at a plurality of times. In such a case, the aforementioned generating and outputting may be carried out for the operational ratios at the respective times from a processing start time to a processing end time. Thus, it becomes easy to grasp not only the plane maldistribution of the operational ratio, but also, the temporal maldistribution of the operational ratio.

A semiconductor circuit design support method relating to a third aspect includes: identifying wirings connected to a selected cell to be processed from an observation target circuit data storage device storing position data of each cell on a semiconductor chip on which an observation target circuit is implemented for which operations are observed in simulation and data of wirings connected to each cell; determining an operational ratio for the selected cell from the operational ratios of the identified wirings; reading out position data of the selected cell from the observation target circuit data storage device; and generating and outputting image data in which display data corresponding to the operational ratio of the selected cell is disposed according to the position data of the selected cell on a display area corresponding to the semiconductor chip.

By presenting the designer with such screen data, it becomes easy for the designer to understand the plane maldistribution of the operational ratios of cells at a specific time or the like. Namely, it becomes possible to grasp the maldistribution of the power consumption and the like, and to improve the cell arrangement.

Incidentally, the aforementioned display data may have a color or brightness predetermined for a pertinent section among a plurality of sections predefined for the operational ratio. Thus, it becomes more comprehensible.

In addition, the aforementioned operational ratio data storage device may store data of the operational ratios at a plurality of times. In such a case, the determining and the generating and outputting may be executed for the operational ratios at the respective times from the processing start time to the processing end time. Thus, it becomes possible to identify not only the plane maldistribution, but also the temporal maldistribution of the operational ratio.

Furthermore, the aforementioned determining may include determining, as the operational ratio of the selected cell, the maximum value of the operational ratios of output wirings among the identified wirings.

A semiconductor circuit design support method relating to a fourth aspect includes: reading out, from a simulation result storage device storing a number of occurrence times of a specific combinational state of two cells (or a plurality of cells) on semiconductor chip on which an observation target circuit for which operations are observed in a simulation is implemented, the number of occurrence times of the specific combinational state and a corresponding cell for a selected cell; reading out position data of the selected cell and the corresponding cell from an observation target circuit data storage device storing position data of each cell on a semiconductor chip on which an observation target circuit is implemented; and generating and outputting image data in which first display data of the selected cell is disposed according to the position data of the selected cell on a display area corresponding to a semiconductor chip and second display data corresponding to the number of occurrence times for the corresponding cell is disposed according to the position data of the corresponding cell on the display area.

Thus, it becomes easy to grasp the occurrence frequencies of a specific state combination for a combination of arbitrary cells with the plane cell arrangement.

Furthermore, the aforementioned specific state combination may be a simultaneous operating state. Especially, in a case of the simultaneous operating state, it becomes possible to easily grasp the plane maldistribution of the cells in the simultaneous operating state, namely, the plane maldistribution of the power consumption.

Furthermore, the aforementioned second display data may have a color or brightness predetermined for a pertinent section among a plurality of sections predefined for the occurrence frequencies or the operational ratio calculated from the occurrence frequencies. Thus, it becomes more comprehensible.

Incidentally, it is possible to create a program causing a computer to execute the aforementioned method, and such a program is stores in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

Figure 27:
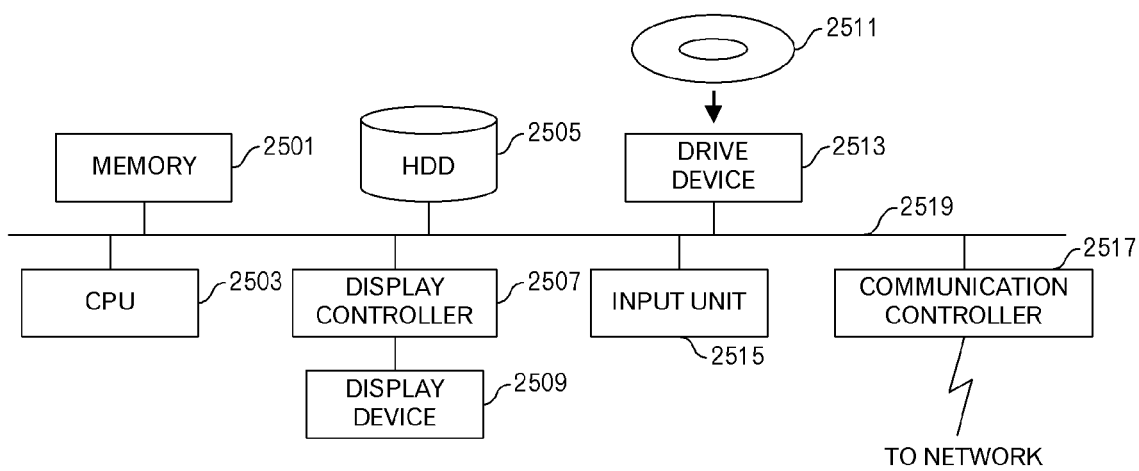
FIG. 27 is a functional block diagram of a computer.
Figure 28:
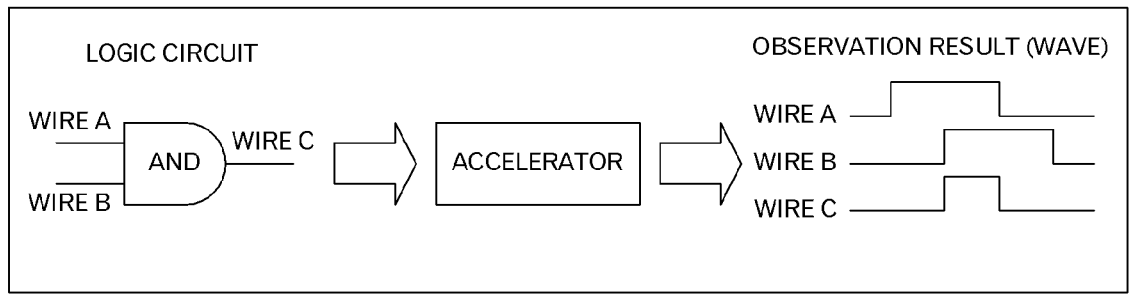
FIG. 28 is a diagram to explain general functions of the accelerator.
Figure 29:
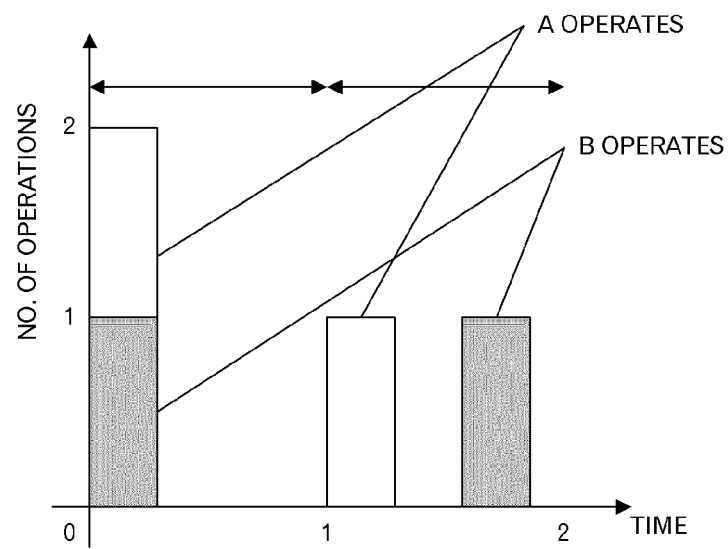
FIG. 29 is a diagram to explain problems of conventional arts.
Figure 30:
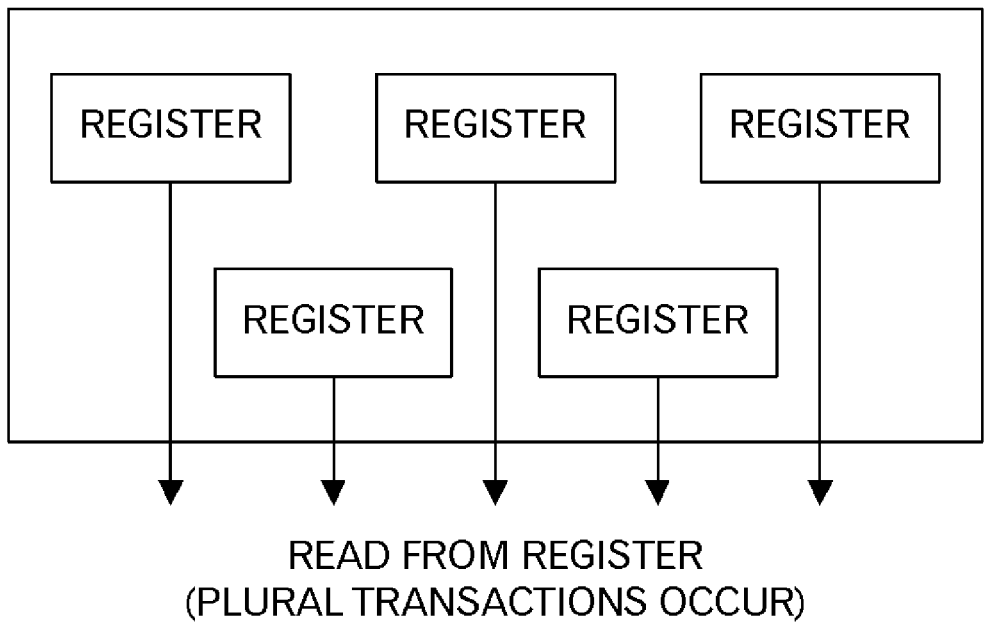
FIG. 30 is a diagram to explain problems of conventional arts.
Figure 31:
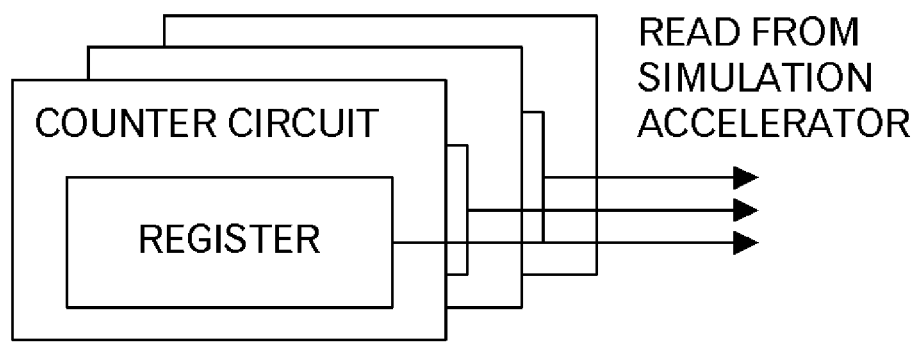
FIG. 31 is a diagram to explain problems of conventional arts.

Incidentally, the semiconductor circuit design support apparatus is a computer device as shown in FIG. 27. That is, a memory 2501 (storage device), a CPU 2503 (processor), a hard disk drive (HDD) 2505, a display controller 2507 connected to a display device 2509, a drive device 2513 for a removal disk 2511, an input device 2515, and a communication controller 2517 for connection with a network are connected through a bus 2519 as shown in FIG. 27. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this invention, the application program to realize the aforementioned functions is stored in the computer-readable removal disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application program are systematically cooperated with each other, so that various functions as described above in detail are realized.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory, computer readable medium storing a program causing a computer to execute a process, the process comprising:
    accepting designation of observation points in an observation target circuit in which operational observation is carried out in simulation;
    storing data relating to said observation points into a storage device;
    attaching circuit data of an observation circuit to circuit data of said observation target circuit, which is stored in an observation target circuit data storage device, so that said observation circuit is connected to said observation target circuit at an observation point of said observation points;
    storing said circuit data of said observation target circuit, which includes said circuit data of said observation circuit, into a simulation data storage device; and
    performing a simulation of said observation target circuit based on data stored in said simulation data storage device;
    wherein said observation circuit comprises:
    a plurality of counter circuits, each comprising a first register that stores a number of occurrence times of a specific state at a specific observation point during a first period, a second register that stores a number of occurrence times of said specific state at said specific observation point during a second period, and a switching circuit that causes to output said number of occurrence times, which is stored in said second register, during said first period and causes to output said number of occurrence times, which is stored in said first register, during said second period;

a memory that stores the numbers of occurrence times; and an output switching circuit that selects one output of said plurality of counter circuits to cause to write said number of occurrence times into said memory.

2. The non-transitory, computer readable medium as set forth in claim 1, wherein said plurality of counter circuits are identified from data, which is included in said data relating to said designation of said observation points and defines a unit of said observation points.

3. The non-transitory, computer readable medium as set forth in claim 1, wherein said data relating to said observation points comprises designation data of a specific layer in a hierarchical configuration of said observation target circuit.

4. The non-transitory, computer readable medium as set forth in claim 1, wherein said specific state comprises a stop state, a waiting state, a reading state or a writing state of a RAM, a stop state, a waiting state or an operating state of a module, or a state combination of a plurality of modules.

5. An observation circuit for observing an observation target circuit, the observation circuit comprising:

a plurality of counter circuits, wherein each of said plurality of counter circuits counts a number of occurrence times of a specific state that depends upon one or plural signal changes at one or plural observation points;

a switching circuit that outputs one of outputs from the plurality of counter circuits to write the number of occurrence times, wherein the switching circuit is a multiplexer or selector; and a memory that stores the numbers of occurrence times, which is outputted by each of the plurality of counter circuits, wherein each of the plurality of counter circuits stores a number of occurrence times, which is counted during a first period, in a first register, and outputs a number of occurrence times, which is stored in a second register, during the first period, and each of the plurality of counter circuits stores a number of occurrence times, which is counted during a second period, in the second register, and outputs the number of occurrence times, which is stored in the first register, during the second period, wherein the first period and the second period do not overlap with each other, and the switching circuit selects one of the plurality of counter circuits in sequence during the first period and during the second period.

* * * * *